(12) United States Patent
Bullock

(10) Patent No.: US 8,403,608 B1
(45) Date of Patent: Mar. 26, 2013

(54) CARGO RESTRAINT SYSTEM WITH ENHANCED REINFORCEMENT FILAMENT CONTENT

(76) Inventor: Matthew Bullock, McLean, VA (US)

( * ) Notice: Subject to any disclaimer, the term of this patent is extended or adjusted under 35 U.S.C. 154(b) by 0 days.

(21) Appl. No.: 13/284,085

(22) Filed: Oct. 28, 2011

(51) Int. Cl.
*B60P 7/08* (2006.01)

(52) U.S. Cl. ............................. 410/97; 410/34; 410/118

(58) Field of Classification Search ............. 410/32, 410/34, 36, 42, 96, 97, 100, 118, 155; 220/1.5; 206/410, 597; 53/399, 441, 462, 556; 248/499
See application file for complete search history.

(56) References Cited

U.S. PATENT DOCUMENTS

| | | |
|---|---|---|
| 1,705,060 A | 3/1929 | Hintz |
| 2,269,286 A | 1/1942 | Ott |
| 3,547,457 A | 12/1970 | Langer |
| 3,612,463 A | 10/1971 | Grant |
| 3,848,889 A | 11/1974 | Sharrow |
| 3,897,919 A | 8/1975 | Weingarten |
| 3,910,558 A | 10/1975 | Brucker et al. |
| 4,054,226 A | 10/1977 | Bjelland et al. |
| 4,111,132 A | 9/1978 | Plut |
| 4,264,251 A | 4/1981 | Blatt |
| 4,553,888 A | 11/1985 | Crissy et al. |
| 4,640,853 A | 2/1987 | Schmeal et al. |
| 4,799,840 A | 1/1989 | Van Gompel et al. |
| 4,846,610 A | 7/1989 | Schoenleben |
| 4,964,771 A | 10/1990 | Callihan |
| 5,037,256 A | 8/1991 | Schroeder |
| 5,062,751 A | 11/1991 | Liebel |
| 5,086,038 A | 2/1992 | Naef et al. |
| 5,132,156 A | 7/1992 | Trussare, Jr. et al. |
| 5,139,842 A | 8/1992 | Sewell |
| 5,219,251 A | 6/1993 | Kanczuzewski |
| 5,431,284 A | 7/1995 | Wilson |
| 5,484,643 A | 1/1996 | Wise et al. |
| 5,516,244 A | 5/1996 | Baka |
| 5,568,636 A | 10/1996 | Koford |
| 5,595,315 A | 1/1997 | Podd et al. |
| 5,747,131 A | 5/1998 | Kreckel |
| 5,784,761 A | 7/1998 | Allen |
| 5,846,038 A | 12/1998 | Bostelman |

(Continued)

FOREIGN PATENT DOCUMENTS

| | | |
|---|---|---|
| EP | 0542908 | 12/1995 |
| EP | 1184436 A1 | 3/2002 |

(Continued)

OTHER PUBLICATIONS

"Reduce Damage to Bags," Modern Railroads, Apr. 1954, pp. 143-144.

(Continued)

*Primary Examiner* — Stephen Gordon
(74) *Attorney, Agent, or Firm* — Banner & Witcoff, Ltd.

(57) ABSTRACT

A cargo restraint system with enhanced filament characteristics wherein the restraint system includes laminated load restraining strips with a layer of reinforcement material comprising a plurality of substantially parallel bundles of filaments and wherein the layer of reinforcement contains approximately three hundred twenty four ends of reinforcing material and each end of reinforcement material comprises approximately three hundred and twenty one to four hundred and seventeen filaments of reinforcement material and each filament comprises one or more monofilament strands having a total break strength of approximately twenty four grams.

14 Claims, 5 Drawing Sheets

U.S. PATENT DOCUMENTS

| | | |
|---|---|---|
| 5,855,459 A | 1/1999 | Krier et al. |
| 5,947,666 A | 9/1999 | Huang |
| 6,089,802 A | 7/2000 | Bullock |
| 6,227,779 B1 | 5/2001 | Bullock |
| 6,368,036 B1 | 4/2002 | Vario |
| 6,419,434 B1 | 7/2002 | Rahn |
| 6,435,787 B1 | 8/2002 | John |
| 6,527,488 B2 | 3/2003 | Elze et al. |
| 6,533,513 B2 | 3/2003 | Kanczuzewski |
| 6,568,636 B2 | 5/2003 | Fitzgerald et al. |
| 6,607,337 B1 | 8/2003 | Bullock |
| 6,702,532 B1 | 3/2004 | Throener |
| 6,758,644 B1 | 7/2004 | Vick |
| 7,066,698 B2 | 6/2006 | Bullock |
| 7,103,941 B2 | 9/2006 | Vick |
| 7,260,870 B2 | 8/2007 | Vick |
| 7,290,969 B2 | 11/2007 | Bullock |
| 7,367,765 B2 * | 5/2008 | Frett .............................. 410/118 |
| 2003/0206782 A1 | 11/2003 | Toglia |
| 2004/0185739 A1 | 9/2004 | Vick |
| 2005/0123370 A1 | 6/2005 | Bullock |
| 2005/0123371 A1 | 6/2005 | Bullock |
| 2006/0257226 A1 | 11/2006 | Bullock |
| 2010/0310335 A1 | 12/2010 | Bullock |
| 2010/0310336 A1 | 12/2010 | Bullock |
| 2010/0322736 A1 | 12/2010 | Bullock |
| 2012/0074228 A1 | 3/2012 | Gruenauer et al. |

FOREIGN PATENT DOCUMENTS

| | | |
|---|---|---|
| WO | WO9301979 | 2/1993 |

OTHER PUBLICATIONS

"Superior equipment capacity spurs B.C. paper maker's switch to CP Rail," CP Rail Report, Sep./Oct. 1989, p. 1.

"Hexacomb kraft honeycomb:Pactiv Panels" Sales Brochure, Copyright 1996.

TY-GARD Sales Brochure, Walnut Industries, at least as early as 1998.

TY-GARD Freight Restraint System Sales Brochure, Walnut Industries, at least as early as 1998.

International Search Report and Written Opinion in PCT/US2012/061310 mailed Jan. 8, 2013.

International Search Report and Written Opinion in PCT/US2012/061317 mailed Jan. 22, 2013.

International Search Report and Written Opinion in PCT/US2012/061303 mailed Jan. 22, 2013.

International Search Report and Written Opinion in PCT/US2012/061339 mailed Jan. 8, 2013.

International Search Report and Written Opinion in PCT/US2012/061318 mailed Jan. 8, 2013.

* cited by examiner

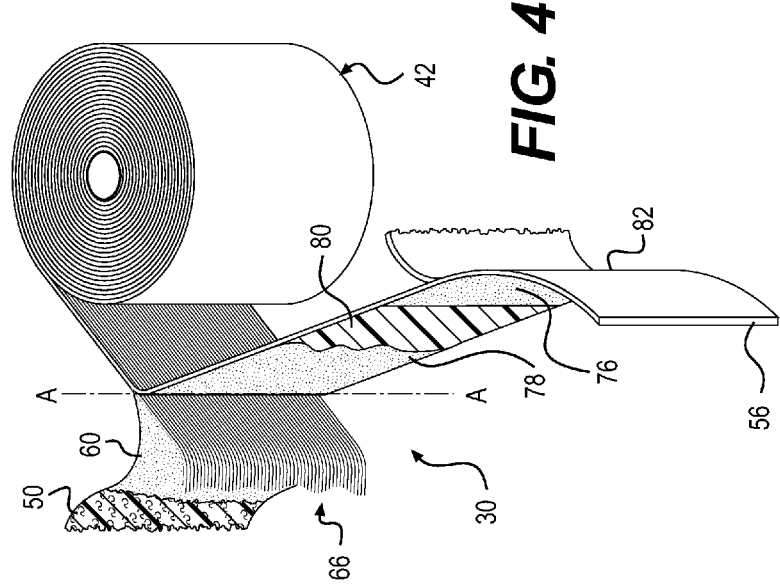
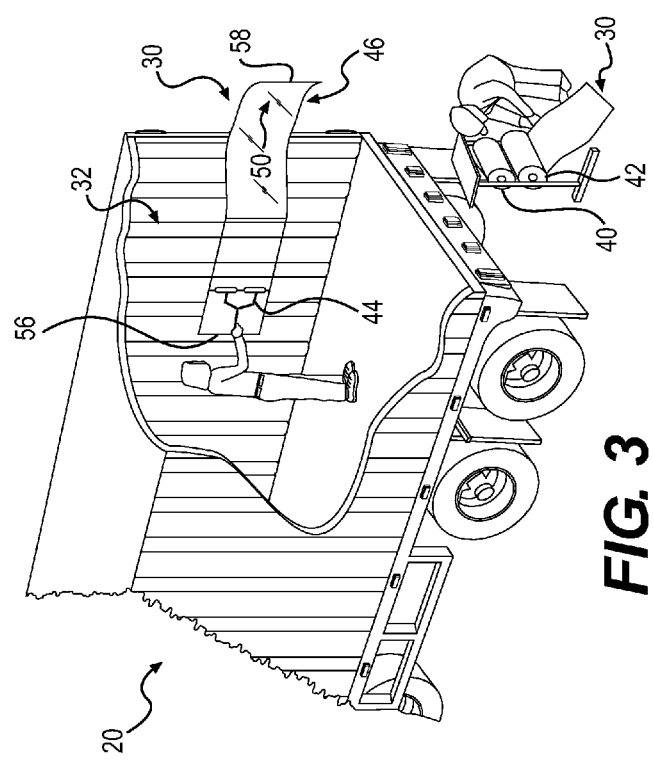

CARGO RESTRAINT SYSTEM WITH ENHANCED REINFORCEMENT FILAMENT CONTENT

RELATED PATENTS

This application relates to U.S. Pat. No. 6,089,802 entitled "Cargo Restraint System for a Transport Container" issued on Jul. 18, 2000; U.S. Pat. No. 6,227,779 entitled "Cargo Restraint Method for a Transport Container" issued on May 8, 2001; U.S. Pat. No. 6,607,337 entitled "Cargo Restraint System" issued on Aug. 19, 2003; U.S. Pat. No. 6,896,459 issued on May 24, 2005; U.S. Pat. No. 6,923,609 issued on Aug. 2, 2005; U.S. Pat. No. 7,018,151 issued on Mar. 28, 2006; U.S. Pat. No. 7,066,698 issued on Jun. 27, 2006; U.S. Pat. No. 7,290,969 issued on Nov. 6, 2007; U.S. Pat. No. 7,329,074 issued on Feb. 12, 2008 and United States Bullock application for patent entitled "Cargo Restraint Method and System With Enhanced Shear Strength" Ser. No. 12/481,345 filed on Jun. 9, 2009 and United States Bullock application for patent entitled "Cargo Restraint System With Enhanced Peel Strength" Ser. No. 12/486,897 filed on Jun. 18, 2009. All of the above are of common inventorship as the subject application. These patents and applications have not been assigned by the inventor.

BACKGROUND OF THE INVENTION

This invention relates to an improved system for restraining cargo during transportation. More particularly, this invention relates to a novel lashing for securing and restraining undesired movement of drums, boxes, rigid and flexible containers, palletized or not palletized, within the interior of a container for sea, air, rail or overland transport. Moreover this invention relates to a system of enhanced filament content of reinforcing material with characteristics to efficiently control load shifting during transport.

Most shipments for export, both in the United States and abroad, are placed within intermodal containers. Intermodal containers are often loaded with cargo in containment isolation enclosures such as boxes, fifty five gallon closed head drums, super sacks or plastic reinforced bags, plastic wrapped bundles, cased goods, metal coils, specialty heavy paper rolls, plastic or metal containers mounted on pallets, and the like. Although each containment enclosure may be quite heavy and stationary at rest, the mass of a transport load can produce considerable momentum force as a result of ship, aircraft, railcar, or truck changes in motion such as for example by acceleration, deceleration or a change in direction.

Intermodal containers generally have standardized dimensions of twenty or forty feet in length and are fabricated with steel, corrugated sidewalls which are structurally self-supporting and very rugged. Intermodal containers are usually stacked onto ships for ocean transport and are subjected to wave forces of yaw, pitch, heave, sway, and surge. Each of these forces has the potential to impart substantial damage to contents within the intermodal container. In this, when a container changes direction or speed, unsecured cargo within the container tends to continue along an existing path until it contacts an interior wall of the container. Without some type of restraint and/or cushioning system, cargo tends to build up considerable momentum, independent of the container. The amount of momentum is equal to the mass of a load multiplied by its velocity. In the case of large cargo loads, even a small change in velocity or direction can generate substantial motion forces.

For air travel, although commercial passenger flights avoid air turbulence, in some instances clear air turbulence or even rough weather is not avoidable. Moreover for cargo transport, per se, when passengers are not involved, air carriers might use the most direct route regardless of weather conditions.

On overland routes intermodal containers are often "piggybacked" onto railroad flat cars and/or truck trailers. Rail cars may be made up and coupled together by a humping process within a switching yard. When a railroad car is rolled into a stationary string of cars, the impact causes the car couplings to lock together with a jolt. This impact can apply an impact force to cargo within the rail car. Moreover, during transport, railway cars are subject to braking forces, run-in and run-out, coupler impact over grades, rail vibration, dips in the track, and swaying. In a similar manner trucks are subject to stopping and starting forces, emergency braking, bumps and swaying from uneven road beds, centrifugal forces on curves, vibration, etc. all of which tend to shift gravity secured loads within a container.

When cargo contacts the interior walls or doors of a container, the force necessary to reduce cargo momentum to zero must be absorbed by the goods and/or the container. Such forces can result in damage to cargo, damage to interior walls or doors of the container, damage to cargo packing, and moreover may create dangerous leaks if the cargo is a hazardous material. Accordingly, it is undesirable to permit cargo to gain any momentum independent of a container during transport. This is accomplished by restraining the cargo within the container so that the cargo and the container are essentially united and operationally react as one unit during transport.

In order to secure the load during transport and minimize undesired shifting and damage, load containment enclosures are often secured to the floor and/or sides of an intermodal container, boxcar or trailer using specially fabricated wood framing, floor blocking, rubber mats, steel strapping, heavy air bags, etc. All of these previously known systems for securement have limitations associated with construction cost, lack of strength sufficient to secure dense loads, etc. Moreover, although rear doors of a truck trailer may be relied on to at least partially secure non-hazardous materials such as food-stuffs, tissue or soft paper products, furniture, appliances, etc., for hazardous materials, and many other types of loads, the rear doors of a container may not be used to even partially secure a load. In fact, in order to comply with Department of Transportation and Bureau of Explosives regulations, hazardous materials are not permitted to come in contact with or 'touch" rear container doors during an impact.

In the past, cargo was often stabilized by a method of load-locking with lumber bracing. This system involves strategically placing lumber between a load face and rear doors of a container. This, however, can be a costly, time consuming, and generally inefficient means of securing a load. A lumber based bracing and blocking process requires skilled carpenters and is often outsourced to contractors. Moreover, wooden barriers can be time consuming to install.

Wood bracing can be somewhat brittle and subject to failure as a result of an abrupt impact. Further conventional methods of load-blocking with lumber bracing simply can not perform some tasks. For example, the most efficient means of filling an intermodal container is eighty, fifty-five gallon drums, double stacked within a twenty-foot long container. However, if eighty barrels are loaded there are only approximately four inches between the load face and rear doors of a conventional intermodal container. Four inches is not enough space to put sufficient lumber to brace a load of eighty drums adequately. Consequently, when wood bracing is utilized as a system of restraint, shippers are forced to ship containers that are not filled to capacity. This reduces transport efficiency and increases transportation costs. Moreover, some types of wood, such as conifer woods, are not acceptable to cross international boundaries without certification of special fumigation or heat treatment processing.

The Department of Transportation has established a standard to determine if a particular restraint system is capable of adequately securing hazardous cargo. In certain instances, conventional load-locking and lumber bracing has not been structurally rugged enough to receive approval to ship hazardous cargo.

Other known means of restraint such as ropes, metal or plastic straps or stands and the like appearing in the past have tended to be expensive, exhibit impaired performance and are often not functionally suitable to restrain desired loads.

In some instances a trailer or boxcar may be used for shipping where only a partial load is carried. A partial load might be positioned within a central location of a trailer. In this instance it may be impractical to construct wooden front and rear dunnage sufficient to secure a load where the front of the trailer is not utilized. Additionally some partial loads are not symmetrically positioned on a pallet and securement must therefore accommodate an asymmetric load situation.

Improved cargo, flexible lashing, restraint systems and methods, such as disclosed in the related patents noted in paragraph [0001] above, have offered a substantial advance in the field of securement of loads within intermodal containers and the like. A continuing need exists, however, for securing lading within intermodal containers, air transport containers, boxcars, truck trailers, and the like that is functionally effective, cost-efficient, labor-efficient, and is concomitantly able to comply with Department of Transportation and Bureau of Explosives regulations. In this, a need exists for securement systems that have enhanced filament efficiency and cost characteristics while limiting undesirable cargo movement within a container.

The limitations suggested in the preceding and/or desirable characteristics for advantageous load restraint systems are not intended to be exhaustive but rather are among many which may tend to reduce the effectiveness or desirability of cargo restraining systems known in the past. Other noteworthy problems may also exist; however, those presented above should be sufficient to demonstrate that cargo-restraining systems appearing in the past will admit to worthwhile improvement.

OBJECTS AND SUMMARY OF THE INVENTION

Objects

It is a general object that the subject invention provide a novel system and method to secure a load within an intermodal container, or the like, which will obviate or minimize problems and concomitantly achieve at least some of the desired aspects of efficient lading securement within a container.

It is another general object of the invention to judiciously protect cargo from damage during transport and to provide enhanced efficiency securement of a load within a container while minimizing shifting of a container load.

It is a further object of the invention to provide a securement system for an intermodal container, and the like, with enhanced cost efficiency with respect to securing lading to the sidewalls of an intermodal container, air container, rail car, trailer and the like during transport.

It is a related object of the subject invention to optimize the use of lashing filaments with reduced costs while maintaining operational characteristics necessary to secure lading within an intermodal container, and the like.

BRIEF SUMMARY OF THE INVENTION

One preferred embodiment of the invention comprises a flexible load restraining strip for use in securing cargo within a transport container subject to shifting forces during transport. The flexible load restraining strip has a first end and a second end and the load restraining strip includes a first cover layer of material having a first side surface and a second side surface extending coextensively with the flexible load restraining strip from the first end to the second end thereof.

A first layer of adhesive coextensively extends along and coats the second side surface of the first cover layer of material of the flexible strip from the first end to the second end of the first cover layer of material. The first layer of adhesive has a first side surface and a second side surface and the first side surface is in adhesive engagement with the first cover layer of material.

The flexible load restraining strip further includes a layer of reinforcement having a first side and a second side and is bound on the first side to the second side surface of the first layer of adhesive. The layer of reinforcement comprising a plurality of substantially parallel bundles of filaments extending throughout the length of the flexible load restraining strip. The layer of reinforcement contains approximately three hundred and twenty four (324) ends of reinforcement filament material and each end of reinforcement material comprises approximately three hundred and twenty one (321) to four hundred and seventeen (417) filaments of reinforcement material. Each filament of reinforcement material comprises one or more monofilament strands having a combined break strength of the monofilament strand or strands of approximately twenty four (24) grams.

A second layer of adhesive having a first side surface and a second side surface extends along and partially coats the second side of the layer of reinforcement from the first end of the load restraining strip to a position less than or approximately equal to five feet from the first end of the flexible load restraining strip.

Finally, a layer of release material extends coextensively with and is releasably adhered to the second side surface of the second layer of adhesive applied to the second side of the layer of reinforcement. The layer of release material may be removed from the second layer of adhesive on site of use and the load restraining strip is operable to be releasably affixed to a side wall surface of a cargo transport container such that the load restraining strip may be used as a flexible securement element to secure cargo within a transport container with enhanced filament efficiency characteristics.

THE DRAWINGS

Other objects and advantages of the present invention will become apparent from the following detailed description of preferred embodiments taken in conjunction with the accompanying drawings wherein:

FIG. 3 is a pictorial view of a dispensing roll of flexible load restraining strips operable to be cut into approximately twelve foot lengths for use in restraining cargo within an intermodal container and is partially broken away to disclose application of a cargo restraining strip to an interior wall surface of an intermodal container positioned on a truck trailer;

FIG. 4 is an exploded view of a roll of lashing strips in accordance with the invention, partially broken away, disclosing details of various layers of the lashing as pulled from a storage and dispensing roll;

DETAILED DESCRIPTION

Context of the Invention

Figure 1:
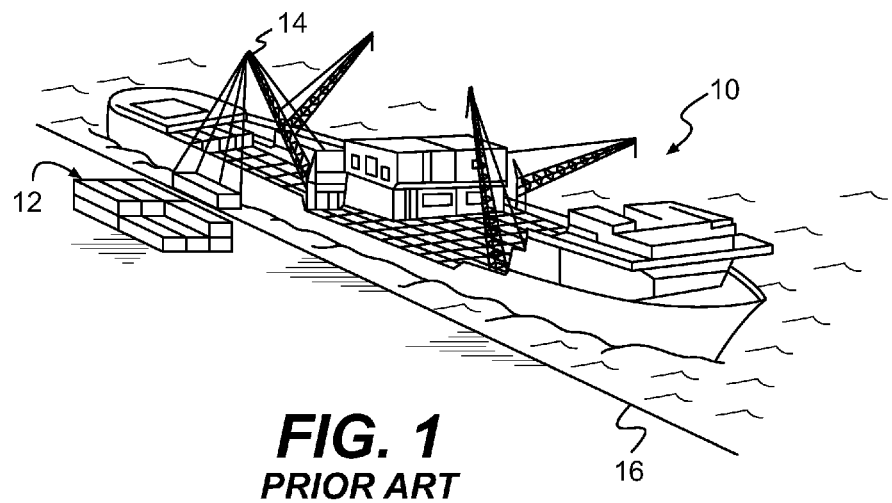
FIG. 1 is an aerial view of a schematic container ship at a dock with cranes lifting and loading intermodal containers onto the ship for ocean going transport.

Referring now particularly to FIG. 1, a schematic illustration depicts an ocean going vessel 10 docked at a port and intermodal containers 12 are being loaded onto the ship. Cranes 14 mounted on board the ship or on the dock 16 are shown stacking intermodal containers on top of each other and the containers are ruggedly secured on the deck of the ocean going vessel 10. The subject invention may be advantageously used to secure cargo within the intermodal containers 12 or air transport containers, rail cars, truck trailers and the like.

Figure 2:
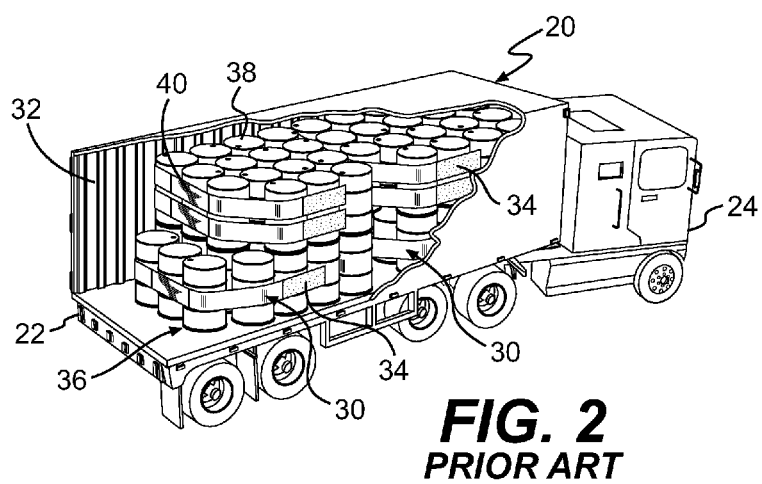
FIG. 2 is an axonometric view, partially broken away, showing an interior arrangement of cargo within an intermodal container secured to a flatbed trailer, with a partial load secured within the container.

FIG. 2 is an axonometric view, partially broken away, and discloses another operating context of the invention. In this view an intermodal or cargo container 20 is shown mounted upon a trailer 22 which is operably towed by a tractor 24 for land transport. Containers such as these are also often mounted on railway flat cars either directly or as attached to truck trailers 22.

A partially cut away rear corner portion of FIG. 2 shows use of a cargo restraining strip 30 which is operable to be self-adhered to an interior wall surface 32 of the intermodal cargo container 20. The cargo securement system shown in FIG. 2 comprises a pair of opposing restraining strips 30—self-adhered to opposing side walls of the container 20 by the use of adhesive segments 34 that adhere to opposing portions of the container side walls 32. The restraining strips 30 are wrapped behind a load and embrace the rear face of cargo 36 to be secured such as fifty five gallon drums 38. The restraining strips 30 overlap across the face of a load and are folded and drawn tightly together by a torque tool. Then an independent overlying patch segment 40 is applied to the junction to unite the opposing restraining strips 30 extending from the container side walls to secure the cargo to the interior wall surfaces of the intermodal container 20.

FIG. 3 discloses a view of an individual load restraining strip 30 that is shown being applied to a side wall surface 32 of an intermodal container 20. In this, FIG. 3 shows an individual load restraining strip 30 cut from a dispensing roll 42 and then applied to the side wall 32 of the intermodal container 20. As taught in the related patents listed above an installer first pulls a release paper off of an end of the strip and positions the strip 30 by hand onto the side wall surface 32 of the container. Then a rolling tool 44, or similar device, is used to firmly engage an adhesive portion of the strip 30 firmly against the side wall surface 32 of the intermodal container.

Load Restraining Strips

Figure 5:
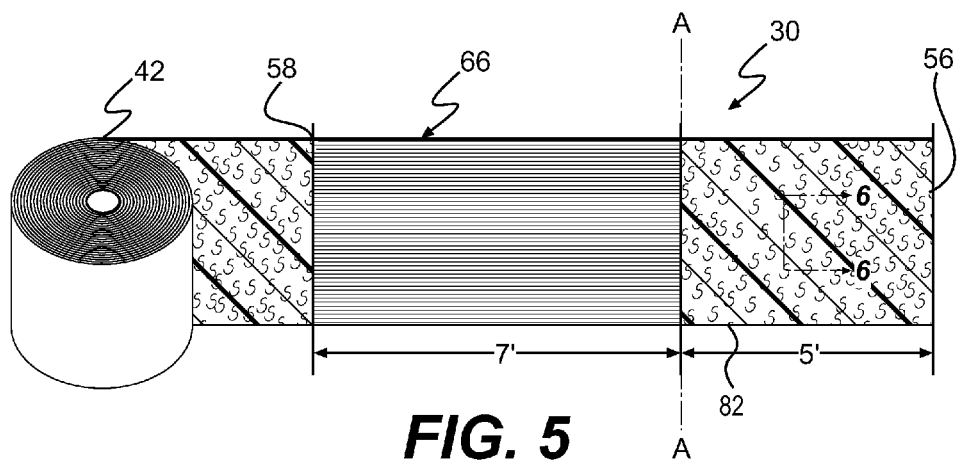
FIG. 5 is a side view of a flexible lashing strip as shown in FIG. 4.
Figure 6:
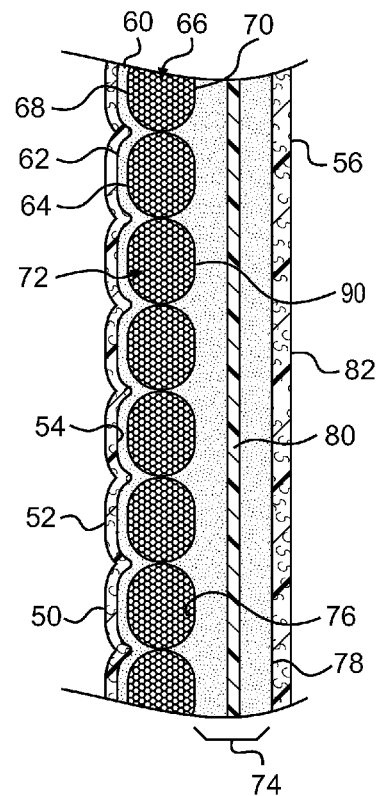
FIG. 6 is a partial cross-sectional view taken along section line 6-6 in FIG. 5 and discloses an arrangement of structural layers of lashing material at a first end portion of the flexible cargo restraint lashing.

Turning to FIGS. 4-6 more detailed views of the restraining strip 30 are disclosed. The load restraining strip 30 comprises a first cover layer of material 50 having a first side surface 52 and a second side surface 54 extending coextensively with the flexible load restraining strip 30 from a first end 56 to a second end 58 of the flexible load restraining strip 30. This first layer of material may be a spun bonded polyester or other material suitable to function as a cover and support for a layer of reinforcement to be discussed below.

A first layer of adhesive 60 coextensively extends along and coats the second side surface 54 of the first cover layer of material 50 of the flexible strip from the first end 56 to the second end 58 of the first cover layer 50. The first layer of adhesive 60 has a first side surface 62 and a second side surface 64. The first side surface 62 is in adhesive engagement with the second side surface 54 of the first cover layer of material 50.

The flexible load restraining strip 30 further includes a layer of reinforcement 66 having a first side 68 and a second side 70. The reinforcement 66 is bound on the first side 68 to the second side surface 64 of the first layer of adhesive 60. The layer of reinforcement 66 comprises a plurality of substantially parallel bundles or ends 72 of filaments extending throughout the length of the flexible load restraining strip 30. The ends 72 are schematically shown in FIG. 6 within an imaginary generally elliptical encasement. In practice there is no separate or distinctive encasement isolating one end 72 from a next adjacent end, however, the ends tend to stay together as a bundle of filaments.

A second layer of adhesive 74 is applied to the flexible load restraining strip 30. The second layer of adhesive includes a first side surface 76 and a second side surface 78. The second layer of adhesive 74 extends along and partially coats the second side 70 of the layer of reinforcement 66 from the first end 56 of the load restraining strip 30 to a position less than or approximately equal to five feet from the first end 56 of the flexible load restraining strip as shown in FIGS. 4 and 5 where the second layer of adhesive 74 extends along the flexible load restraining strip 30 to as imaginary line A-A.

The second layer of adhesive layer 74 may include a substrate 80. In the event a substrate is necessary or desirable it is embedded within the second layer of adhesive 74 as shown in FIGS. 4 and 6. The substrate 80 but may be composed of an acrylic sheet having a plurality of transverse holes or a resin differential polymer with holes to render the substrate porous, or VALERON® which may be fashioned in the form of a screen foundation. Companies such as DuPont, Hoeschst Celanese, and others manufacture such materials. Alternatively, the substrate 80 may not be porous and comprise a sheet of Mylar®. Mylar is a strong polyester film manufactured by DuPont Teijin Films.

Finally, a layer of release material 82 such as a waxed paper stock extends coextensively with and is releasably adhered to the second side surface 78 of the second layer of adhesive 74. The layer of release material enables the flexible load restraining strips to be produced in a roll form (note again FIGS. 3-5) and is operably removed from the second layer of adhesive 74 on site. The load restraining strip 30 is then releasably affixed to a side wall surface of a cargo transport container by pressing the second layer of adhesive 74 against an internal wall surface 32 of a transport container as discussed above.

In one embodiment the strips 30 are transversely perforated, at approximately twelve foot lengths, so that a strip 30 can be torn off of a roll 42 on site. Alternatively one side of the strip 30 can be marked in twelve foot lengths so that the load restraining strip can be facially cut from the roll 42, as shown in FIG. 3, to create a single strip 30 approximately twelve foot long for use on a job site. Preferably, the restraining strip 30 is approximately sixteen inches in width; however, other widths may be substituted depending on the need for additional strength and adhesion to the side wall surface 32.

The adhesives 60 and 74 are composed of an acrylic that exhibits the characteristics of high tack and high shear strength and bonds well to metals. In addition the adhesive must have excellent high temperature and cold temperature characteristics so that the intermodal container can be shipped in all normal ambient operating conditions. Finally the adhesive should have low peel strength characteristics. When the container is unloaded the load restraining strips 30 may be facilely removed by being reverse peeled away from the side wall surfaces 32 of the container by hand without leaving a residue. Adhesives of the type suitable for use in intermodal containers are available from the Venture Tape Company of Rockland, Mass.

Reinforcement Layer Construction

Figure 7:
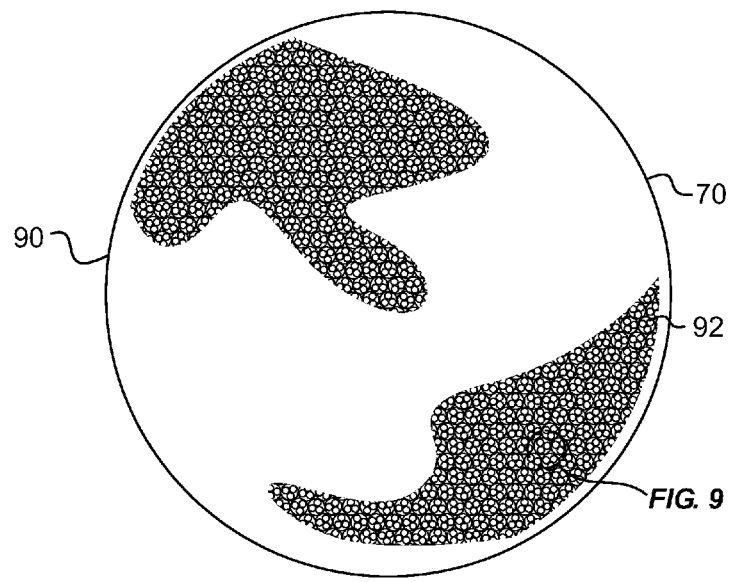
FIG. 7 is an enlarged schematic cross-sectional view of a single end of reinforcement material in accordance with one embodiment of the invention.
Figure 8:
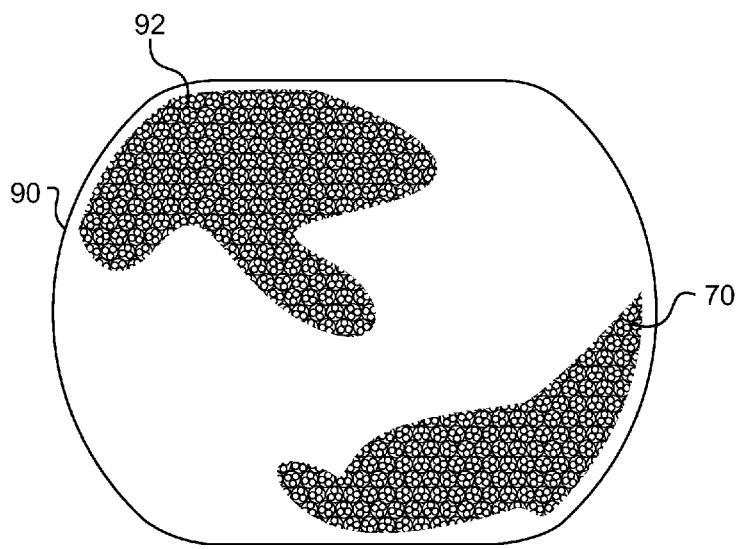
FIG. 8 is a cross-sectional view similar to FIG. 7 disclosing an alternative end configuration of reinforcement material.

Turning now to FIGS. 6, 7 and 8 individual bundles or ends 70 of the layer of reinforcement material 66 is shown in more detail. Each of the ends 70 may be generally circular in cross section as shown in FIG. 7 or more elongated and generally elliptical as shown in FIG. 8. In either configuration the ends are illustrated with an imaginary circumferential enclosure 90 that generally defines an outer boundary for each end.

The ends 70 are distributed approximately evenly across the width of the flexible load restraining strip 30 and for a width of flexible load restraining strip 30 of approximately sixteen inches, in one operative embodiment, the number of ends 70 will be approximately three hundred and twenty four (324) spread evenly across the width of the flexible load restraining strip 30.

It has been determined by analysis and conducting trial and error impact testing using restraining lashing that for a properly functioning restraining strip or lashing 30 of approximately three hundred and twenty four (324) ends of reinforcement, each end should be composed of a plurality of individual filaments 92 which extend in a generally consistent and uniform pattern at each end.

It has been determined that the number of filaments 92 for each end 70 should be between approximately three hundred and twenty one (321) and four hundred and seventeen (417) filaments per end 70 of reinforcing material. A presently preferred number of filaments is three hundred and sixty nine (369) although a lesser number of filaments down to approximately three hundred and twenty one (321) per ends can be used.

Figure 9:
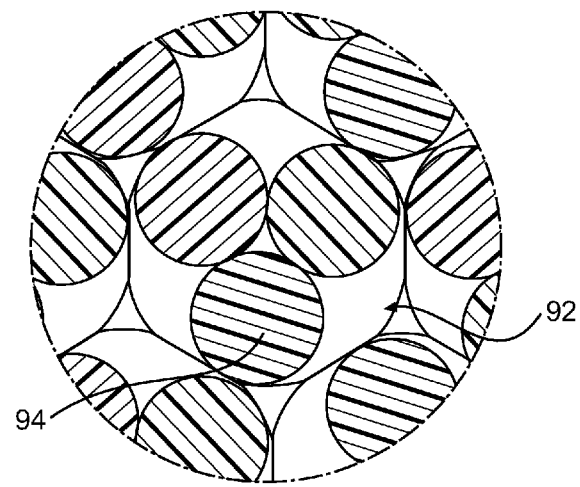
FIG. 9 is a partial cross-sectional schematic view of a single filament, with additional partially depicted surrounding reinforcing strand bundles.
Figure 10:
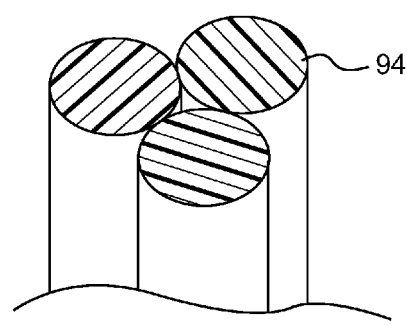
FIG. 10 is an axonometric view of a plurality of individual monofilament, fine denier, strands of reinforcing material that make up each of the filaments of reinforcing material depicted in FIGS. 7-9.

Referring now to FIGS. 9 and 10 each of the filaments 92 noted in the paragraph above is preferably composed of three (3) monofilament strands 94 of a fine denier per strand. It has been determined for a preferred embodiment of the invention that a strand of approximately 1500 denier polyester performs well and each strand has a break strength of approximately eight (8) grams.

As noted above and shown particularly in FIGS. 9 and 10 each of the monofilament strands 94 may be composed of fine polyester fibers. Alternatively other fine denier fibers may be used such as a polypropylene, polyethylene, polyolefin, glass fiber, an aramid such as Kevlar®, carbon fibers, and the like. Kevlar® is a polyamide in which all the amide groups are separated by para-phenylene groups. Kevlar® is a registered trademark of the DuPont Company of Wilmington, Del. Regardless of the monofilament used and the number of monofilaments used the resulting filament composed of one or more monofilaments should have a break strength of approximately twenty four (24) grams.

In the subject application, and in the claims, the term 'transport container" is used in a generic sense for all forms of transport units that are capable of containing cargo. A transport container unit includes but is not limited to intermodal containers, air transport containers, railway cars—such as box cars, truck trailers, and the like having undulating or smooth side wall surfaces.

In the specification and claims the expression "approximately" as it appears in connection with a specific numerical value means and includes plus of minus seven and one half (7.5) percent of the numerical value expressed.

In this application the term "denier" is used as a measure of the fineness of a monofilament. One "denier" is defined in this application as the mass, in grams, of nine thousand (9,000) meters of the monofilament. For example a polyester filament, nine thousand meters in length weighing 1500 grams is called a 1500 denier polyester monofilament.

In describing the invention, reference has been made to preferred embodiments. Those skilled in the art, however, and familiar with the disclosure of the subject invention, may recognize additions, deletions, modifications, substitutions, and/or other changes which will fall within the purview of the invention as defined in the following claims.

What is claimed is:

1. A flexible load restraining strip for use in securing cargo within a transport container subject to shifting forces during transport said flexible load restraining strip having a first end and a second end and said flexible load restraint strip comprising:
    a first cover layer of material having a first side surface and a second side surface and extending coextensively with said flexible load restraining strip from the first end to the second end of said flexible load restraining strip;
    a first layer of adhesive coextensively extending along and coating said second side surface of said first cover layer of material of said flexible load restraining strip from a first end to a second end of said first cover layer of material, said first layer of adhesive having a first side surface and a second side surface and said first side surface of said first layer of adhesive being in adhesive engagement with said second side surface of said first cover layer of material;
    a layer of reinforcement having a first side and a second side and being bonded on said first side to said second side surface of said first layer of adhesive, said layer of reinforcement comprising a plurality of substantially parallel bundles of filaments extending throughout a length of said flexible load restraining strip wherein,
        said layer of reinforcement comprises approximately three hundred and twenty four ends of reinforcement filament material,
        each end of reinforcement filament material comprises approximately three hundred and twenty one to four hundred and seventeen filaments of reinforcement material, and
        each filament of reinforcement material comprises one or more monofilament strands having a total break strength of approximately twenty four grams per filament;
    a second layer of adhesive having a first side surface and a second side surface and extending along and partially coating said second side of said layer of reinforcement from said first end of said load restraining strip to a position along said flexible load restraining strip of less than or approximately equal to five feet toward said second end of said flexible load restraining strip; and a layer of release material extending coextensively with and releasably adhered to said second side surface of said second layer of adhesive applied to said second side of said layer of reinforcement, wherein said layer of release material may be removed from said second layer of adhesive on site of use and said load restraining strip releasably affixed to a side wall surface of a cargo transport container such that said load restraining strip may be used as a flexible securement element to secure cargo within a transport container with enhanced filament efficiency characteristics of said layer of reinforcement.

2. A flexible load restraining strip for use in securing cargo within a transport container as defined in claim 1 wherein each of said ends of reinforcement comprises:

approximately three hundred and twenty one filaments of reinforcement material.

3. A flexible load restraining strip for use in securing cargo within a transport container as defined in claim 1 wherein each of said ends of reinforcement comprises:

approximately three hundred and sixty nine filaments of reinforcement material.

4. A flexible load restraining strip for use in securing cargo within a transport container as defined in claim 1 wherein each of said ends of reinforcement comprises:

approximately four hundred and seventeen filaments of reinforcement material.

5. A flexible load restraining strip for use in securing cargo within a transport container as defined in claim 1 wherein each monofilament strand of reinforcement material comprises:

a glass fiber material.

6. A flexible load restraining strip for use in securing cargo within a transport container as defined in claim 1 wherein each monofilament strand of reinforcement material comprises:

a carbon fiber material.

7. A flexible load restraining strip for use in securing cargo within a transport container as defined in claim 1 wherein each monofilament strand of reinforcement material comprises:

a polypropylene material.

8. A flexible load restraining strip for use in securing cargo within a transport container as defined in claim 1 wherein each monofilament strand of reinforcement material comprises:

a polyethylene material.

9. A flexible load restraining strip for use in securing cargo within a transport container as defined in claim 1 wherein each monofilament strand of reinforcement material comprises:

a polyolefin material.

10. A flexible load restraining strip for use in securing cargo within a transport container as defined in claim 1 wherein each monofilament strand of reinforcement material comprises:

a polyamide material.

11. A flexible load restraining strip for use in securing cargo within a transport container subject to shifting forces during transport said flexible load restraining strip having a first end and a second end and said flexible load restraint strip comprising:

a first cover layer of material having a first side surface and a second side surface and extending coextensively with said flexible load restraining strip from the first end to the second end of said flexible load restraining strip;

a first layer of adhesive coextensively extending along and coating said second side surface of said first cover layer of material of said flexible load restraining strip from a first end to a second end of said first cover layer of material, said first layer of adhesive having a first side surface and a second side surface and said first side surface of said first layer of adhesive being in adhesive engagement with said second side surface of said first cover layer of material;

a layer of reinforcement having a first side and a second side and being bonded on said first side to said second side surface of said first layer of adhesive, said layer of reinforcement comprising a plurality of substantially parallel bundles of filaments extending throughout a length of said flexible load restraining strip wherein, said layer of reinforcement comprises approximately three hundred and twenty four ends of reinforcement filament material, each end of reinforcement filament material comprises approximately three hundred and twenty one to four hundred and seventeen filaments of reinforcement material, and each filament of reinforcement material comprises three monofilament strands of approximately 1500 denier polyester material;

a second layer of adhesive having a first side surface and a second side surface and extending along and partially coating said second side of said layer of reinforcement from said first end of said load restraining strip to a position along said flexible load restraining strip of less than or approximately equal to five feet toward said second end of said flexible load restraining strip; and a layer of release material extending coextensively with and releasably adhered to said second side surface of said second layer of adhesive applied to said second side of said layer of reinforcement, wherein said layer of release material may be removed from said second layer of adhesive on site of use and said load restraining strip releasably affixed to a side wall surface of a cargo transport container such that said load restraining strip may be used as a flexible securement element to secure cargo within a transport container with enhanced filament efficiency characteristics of said layer of reinforcement.

12. A flexible load restraining strip for use in securing cargo within a transport container as defined in claim 11 wherein each of said ends of reinforcement comprises:

approximately three hundred and twenty one filaments of reinforcement material.

13. A flexible load restraining strip for use in securing cargo within a transport container as defined in claim 11 wherein each of said ends of reinforcement comprises:

approximately three hundred and sixty nine filaments of reinforcement material.

14. A flexible load restraining strip for use in securing cargo within a transport container as defined in claim 11 wherein each of said ends of reinforcement material comprises:

approximately four hundred and seventeen filaments of reinforcement material.

* * * * *